(12) United States Patent
Reed

(10) Patent No.: US 7,830,114 B2
(45) Date of Patent: Nov. 9, 2010

(54) FLEX CIRCUIT INTERFACE FOR WIRELESS CHARGING

(75) Inventor: Daniel P. Reed, Warren, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 769 days.

(21) Appl. No.: 11/763,202

(22) Filed: Jun. 14, 2007

(65) Prior Publication Data

US 2008/0309287 A1 Dec. 18, 2008

(51) Int. Cl.
*H02J 7/00* (2006.01)
*H01F 27/30* (2006.01)
*G06F 13/28* (2006.01)
*H01R 4/66* (2006.01)

(52) U.S. Cl. .................. 320/108; 336/206; 711/115; 439/67

(58) Field of Classification Search .............. 320/108; 336/206
See application file for complete search history.

(56) References Cited

U.S. PATENT DOCUMENTS

| | | | |
|---|---|---|---|
| 5,550,452 A | 8/1996 | Shirai et al. | |
| 5,959,433 A | 9/1999 | Rohde | |
| 5,963,012 A * | 10/1999 | Garcia et al. | 320/106 |
| 5,993,247 A | 11/1999 | Kidd | |
| 6,084,380 A | 7/2000 | Burton | |
| 6,326,554 B1 | 12/2001 | Gillette et al. | |
| 6,489,785 B2 | 12/2002 | McAllister | |
| 6,608,464 B1 | 8/2003 | Lew et al. | |
| 6,683,438 B2 | 1/2004 | Park et al. | |
| 7,180,265 B2 * | 2/2007 | Naskali et al. | 320/108 |
| 2002/0089305 A1 * | 7/2002 | Park et al. | 320/108 |
| 2003/0231001 A1 * | 12/2003 | Bruning | 320/108 |
| 2004/0145343 A1 | 7/2004 | Naskali et al. | |
| 2005/0189910 A1 | 9/2005 | Hui | |
| 2006/0214628 A1 | 9/2006 | Chang | |
| 2007/0024238 A1 | 2/2007 | Nakade et al. | |

OTHER PUBLICATIONS

Minco, Web site print out dated Apr. 10, 2007 from minco.com, "Minco Flex-Coils Combine Antenna and Circuit in a Small Package," 1 page.
Minco, Web site print out dated Apr. 10, 2007 from minco.com, "Solving Interconnect Problems," 2 pages.

* cited by examiner

*Primary Examiner*—Edward Tso
*Assistant Examiner*—Yalkew Fantu
(74) *Attorney, Agent, or Firm*—Dickinson Wright PLLC

(57) ABSTRACT

A flex circuit interface for inductively charging a power source includes a flex circuit having a primary-portion and at least one folding portion. A device contact and a battery contact are disposed on a folding-portion. A secondary coil is disposed on the flex circuit for receiving inductively transferred power. A secondary receiving circuit is also disposed on the flex circuit. The secondary receiving circuit is in communication with the secondary coil to receive power from the coil. The flex circuit includes a battery contact and at least one pass-through contact. The battery contact is in communication with the secondary circuit for delivering power to the battery.

32 Claims, 6 Drawing Sheets

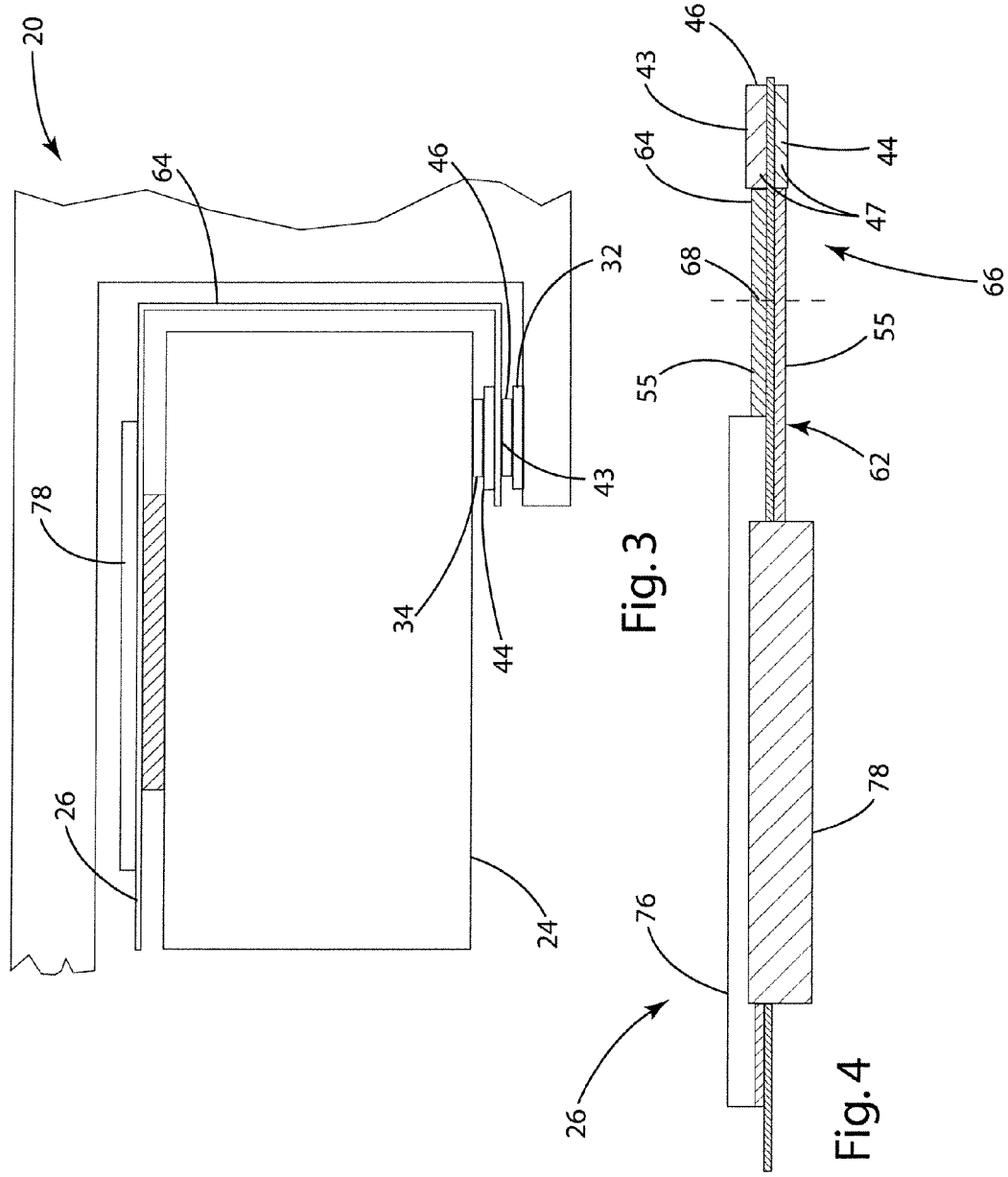

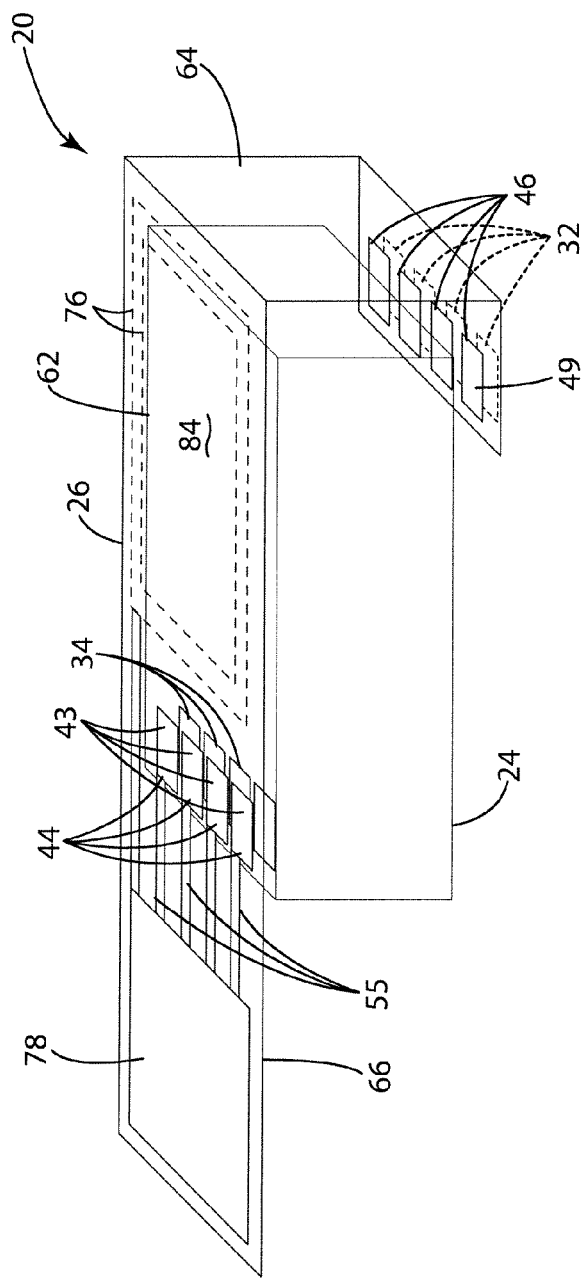
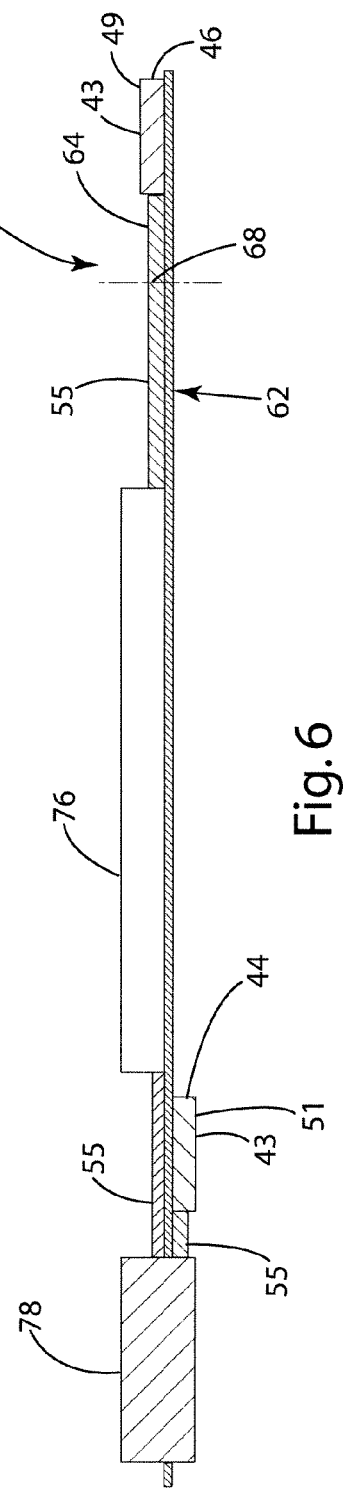

FLEX CIRCUIT INTERFACE FOR WIRELESS CHARGING

BACKGROUND OF THE INVENTION

1. Field of the Invention

The present invention is directed to a wireless charging system and more specifically, to a flex circuit interface for charging a battery.

2. Description of the Prior Art

Traditionally, to charge a portable electronic device, such as a cell phone, a charging cord having a connector is required to connect the portable electronic device to an energy source. The charging cord connector is inserted into a connector port on the electronic device to deliver power from the power source to the electronic device to charge the battery.

More recently, as an alternative to the use of charging cords that physically connect the electronic device to the power source to charge a battery and/or power supply, some manufacturers have been turning to electromagnetic induction. Electromagnetic induction includes the use of a primary unit connected to a power supply and a primary coil that generates an electromagnetic field when a current flows through the coil. A secondary coil is provided in a remote electronic device such that when placed on or in proximity to the primary unit, which has current flowing through the primary coil, the electromagnetic field produced by the primary coil induces a current in the secondary coil of the remote electronic device. As such, the power is transferred wirelessly between the primary unit and the remote electronic device without the need for charging cords.

Early adapters of electromagnetic induction technology have primarily been electronic device manufactures of items that are placed near water, such as electric toothbrushes and razors where eliminating the wired power connection increases user safety. However, these manufacturers typically provide a special adaptor that interfaces with and aligns the device. Therefore, these inductive systems can only be used with their specialized base, and cannot be used with any other type of inductive charging system. Furthermore, the inductive charging systems are not capable of being connected to the power source by a wired charging cord as a redundant method of charging, if the inductive charging unit is defective. The devices also contain a specific coil that is within the device and is not adaptable for use in other devices.

Existing devices which were not made with inductive charging capability cannot be adapted to inductive charging, unless they are physically attached to a separate inductive receiving unit, including the secondary coil, by way of the charging port. These separate induction devices are bulky and have not been readily adapted by consumers. Therefore, there is a desire for an inductive system that easily and cheaply allows existing electronic devices that require a charging cord connected to the power input connector on the electronic device to be modified to receive inductive charging, thereby eliminating the need for the physical power cord. Furthermore, there is a desire to easily and cheaply modify existing electronic devices to receive both inductive charging and the traditional power cord attached to a connector port, or both depending on what system is the most convenient for the user.

SUMMARY OF THE INVENTION AND ADVANTAGES

The present invention is directed to a flex circuit for inductively charging a power source, such as a battery, of an electronic device. The flex circuit includes a secondary coil in electrical communication with a secondary receiving circuit. The flex circuit also includes at least two battery contacts, for contact with the battery and may further include device contacts. In addition, the battery and device contacts may act as pass-through contacts. The flex circuit includes a primary-portion and at least one folding portion. The battery and/or device contacts may be located on either the primary-portion or the folding portion of the flex circuit. In some embodiments the battery contacts may also act as device contacts. The pass-through contacts allow power to pass between the battery and the device with minimal resistance without passing through the secondary coil, and typically without passing through the secondary receiving circuit. At least one of the battery contacts is in communication with the secondary receiving circuit for delivering power to at least one of the battery or the electronic device.

The battery contact provides a direct interface for delivering power to the battery and may simultaneously, when the battery contact is a pass-through contact to, deliver power to the electronic device. Accordingly, existing electronic devices that require a power cord to deliver power may be easily modified to receive power through inductive charging.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 illustrates an exemplary embodiment of the flex circuit in relation to a battery and an electronic device;

FIG. 4 is a cross sectional view of the flex circuit shown in FIG. 3;

FIG. 5 illustrates an exemplary embodiment of the flex circuit where the battery is rotated 180 degrees horizontally and 180 degrees vertically from the electronic device;

FIG. 6 is a cross sectional view of the flex circuit shown in FIG. 5;

DETAILED DESCRIPTION OF THE INVENTION

Figure 2:
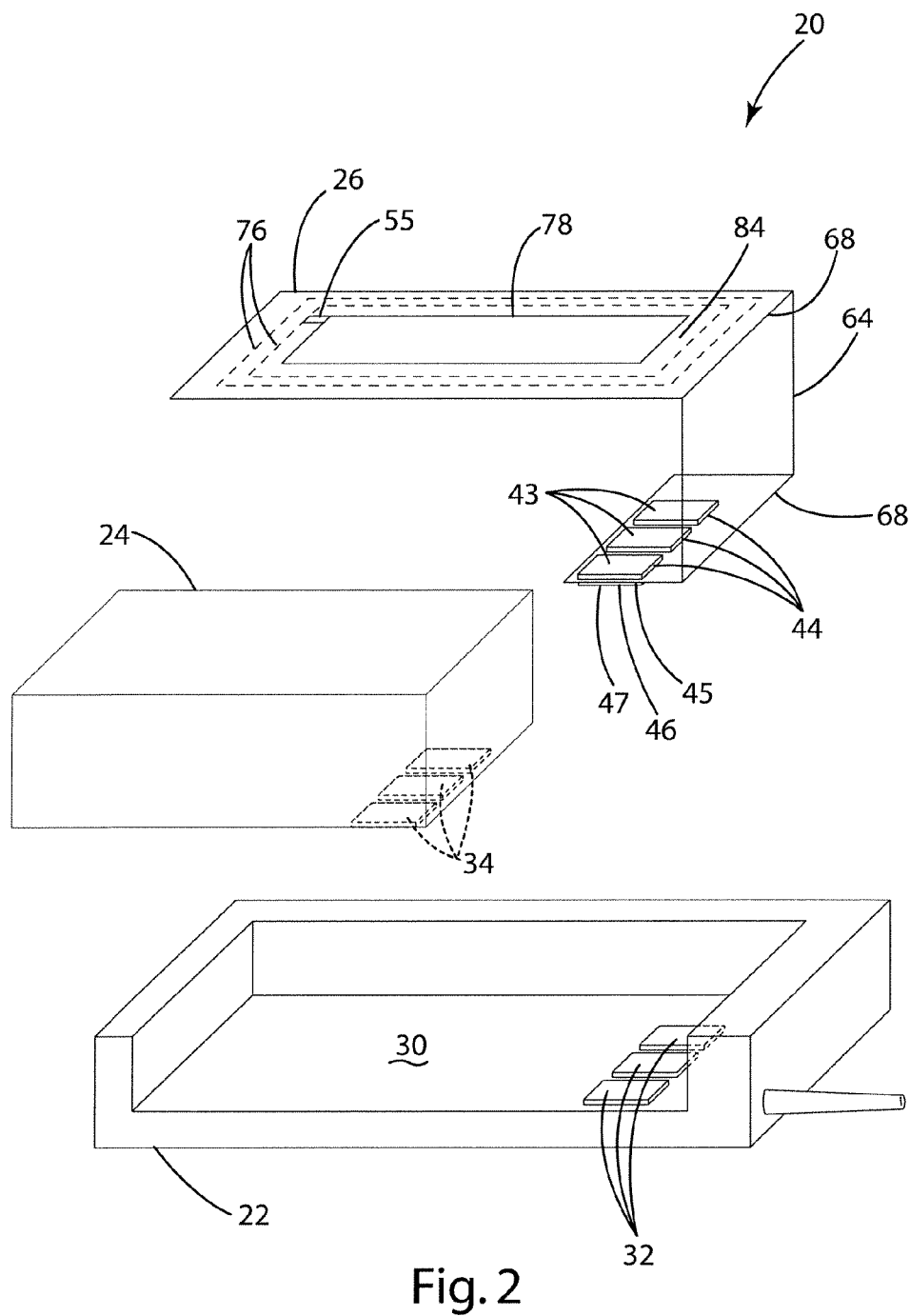
FIG. 2 is an exploded view of the flex circuit interface in relation to a battery and an electronic device.

A flex circuit interface 20 is illustrated generally in FIGS. 2 and 3. The flex circuit interface 20 as generally shown in FIG. 2 includes an electronic device 22, a rechargeable power source such as a battery 24, and a flex circuit 26. The flex circuit 26 inductively receives power from a primary coil (not shown) and provides power to the battery 24 and/or the electronic device 22.

The electronic device 22 can be any electronic device that is desirable to use remotely and not plugged into a power source, such as a cell phone. The electronic device 22 typically includes a compartment 30 for receiving the battery 24. The electronic device 22 typically includes a plurality of device terminals 32 within the compartment 30 for contacting corresponding battery terminals 34 on the battery 24. The device terminals 32 are typically positioned along one end of the compartment 30, however, other configurations are commonly used. The device terminals 32 contact the battery terminals 34 to pass power between the electronic device 22 and the battery terminals 34, such as to power the electronic device 22 or provide power to the battery 24 for charging the battery 24.

Figures 7, 8:
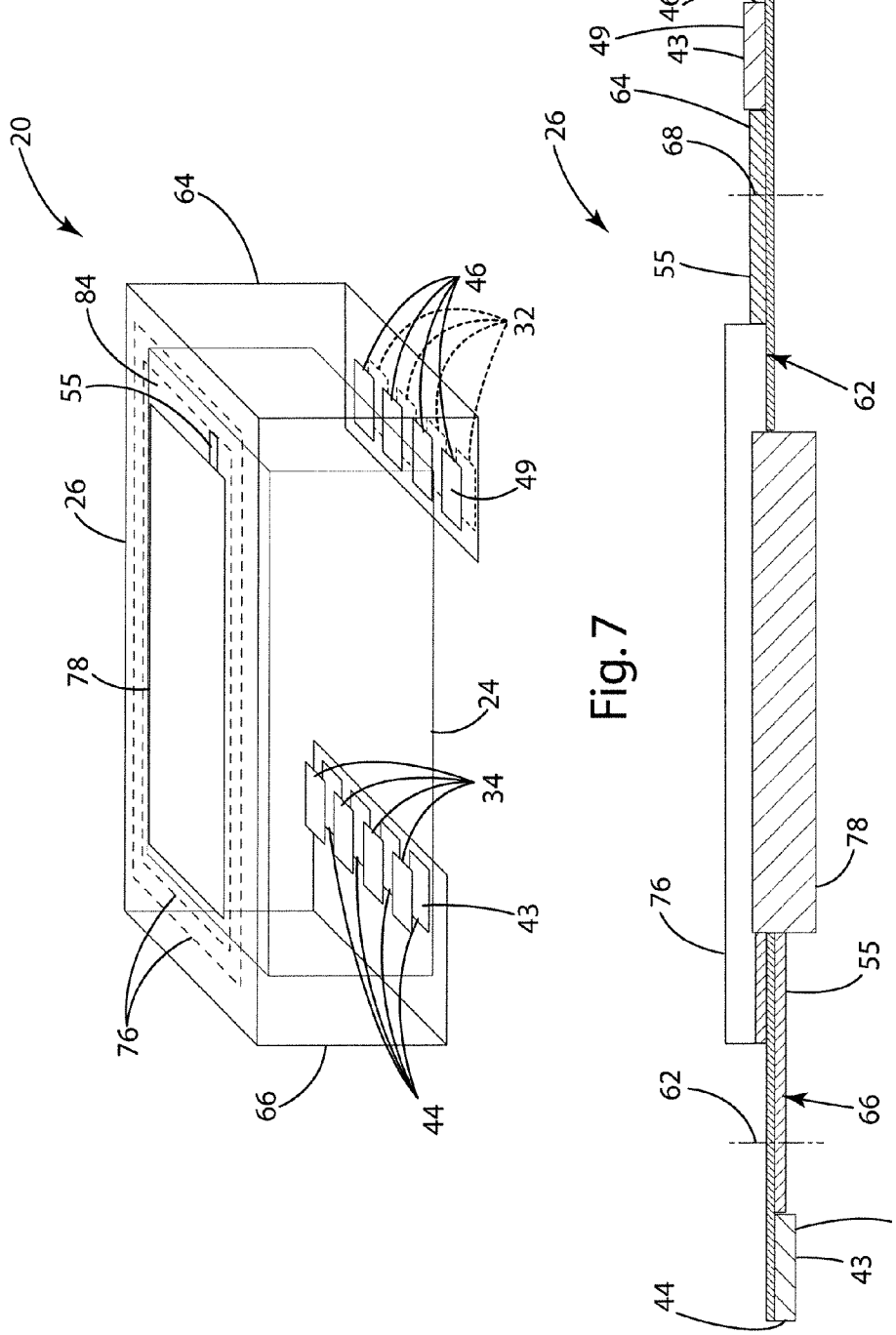
FIG. 7 illustrates an exemplary embodiment of the flex circuit interface where the battery is rotated 180 degrees horizontally from the electronic device.
FIG. 8 is a cross sectional view of the flex circuit shown in FIG. 7.
Figure 9:
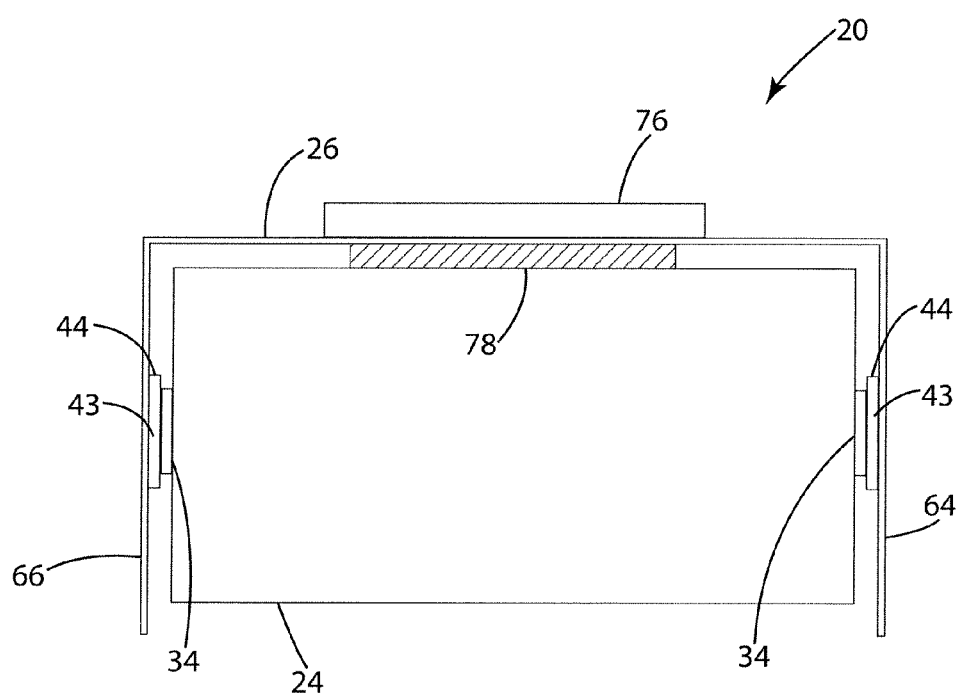
FIG. 9 illustrates exemplary embodiment of the flex circuit interface where the battery includes battery terminals on opposite ends of the battery.

The battery 24 may be formed in any shape; however, for ease of illustration, the battery 24 is illustrated in the figures as having a generally rectangular shape. At least two battery terminals 34 may be disposed one next to the other along one end of the battery 24 similar to the exemplary arrangement of device terminals 32 included in the compartment 30 of the electronic device 22. Of course, other configurations may be used, such as terminals 32, 34 being located on opposing ends as shown in FIG. 9. The device terminals 32 and battery terminals 34 may be disposed at various locations on the electronic device 22 and the battery 24, respectively, but arrangements that provide for easy mating connections between the device terminals 32 and the battery terminals 34 are typically utilized. FIG. 3, FIG. 5, and FIG. 7 illustrate exemplary positions in which the battery 24 can be disposed within the compartment 30 for establishing an electrical connection to deliver power from the battery 24 to the electronic device 22. Each of the battery terminals 34 and the device terminals 32 include at least one ground terminal (−) and at least one power terminal (+). The ground terminal (−) is connected to a ground reference point and provides a ground connection when in electrical connection with the battery 24. When the battery 24 is disposed in the compartment 30, the battery terminals 34 normally contact the device terminals 32 and power is delivered from the battery 24 to the electronic device 22; however, in the present invention the battery contacts 44 and the device contacts 46 are on the flex circuit 26 may be disposed against the battery terminals 34 and the device terminals 32.

Figure 1:
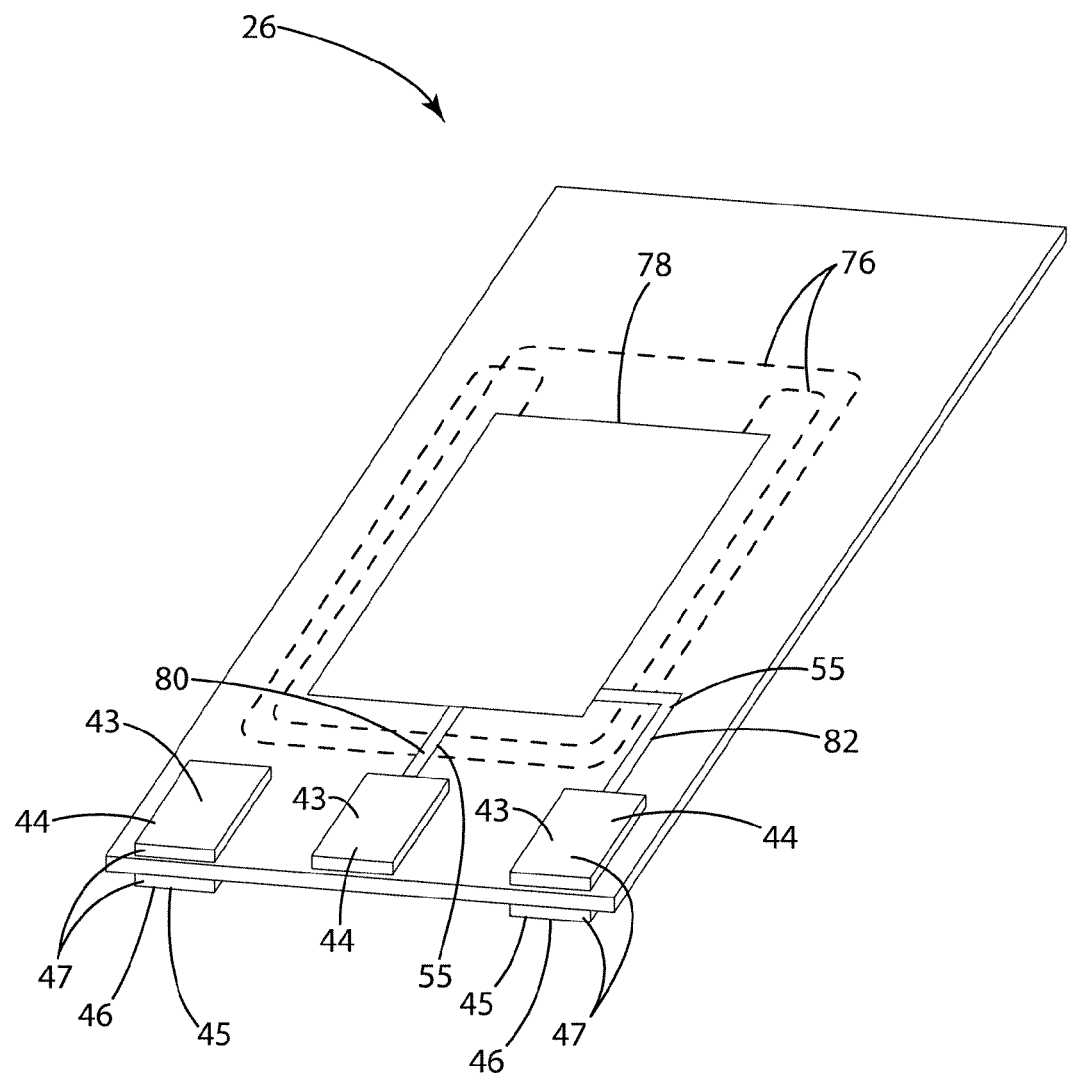
FIG. 1 is an illustration of a flex circuit interface according to the present invention.

The flex circuit 26 includes a primary-portion 62 and at least one folding-portion 64 as shown in FIGS. 2, 3, 4, and 5, or may be formed with only the primary-portion 62, as shown in FIG. 1. Additionally, FIGS. 7, 8, and 9 illustrate exemplary flex circuits 26 having a primary-portion 62, a first folding-portion 64, and a second folding-portion 66 to minimize space required by the flex circuit 26. Each folding-portion 64, 66 may include creases 68 that allow the flex circuit 26 to fold against the battery 24, and of course, depending on the size and shape of the battery 24, multiple creases may be included on folding-portions 64, 66. By disposing electrical components, such as the secondary coil 76 and/or the secondary receiving circuit 78, on primary portion 62 and the folding portions 64, 66 of the flex circuit 26, the components can be folded against the battery 24 to conserve space within compartment 30 of the electronic device 22. The folding portion 64, 66 may also be used to place the secondary coil 76 in close proximity to the primary coil (not shown).

As described above, the flex circuit 26 further includes battery contacts 44, a secondary coil 76, and a secondary receiving circuit 78. The battery contacts 44 are typically flat metallic surfaces 43 for engaging the battery terminals 34. The battery contacts 44 may further include a second surface 45 in electrical communication with the first surface 43, wherein the second surface 45 engages the device terminals 46. Typically, the first and second surfaces 43, 45 are electrically connected in a manner that provides minimal electrical resistance between the battery contacts 44 and/or the pass-through contacts 47. The contacts may be connected to each other or to other electrical components, such as the secondary coil 76 and secondary receiving circuit 78, using electrically conductive copper leads 55.

To better engage the battery terminals 34, the battery contacts 44 may be raised above the surface of the flex circuit 36. While the pressure from the device terminals 32, which are typically spring loaded will typically provide sufficient pressure to the opposite side of the battery contacts 44 to securely engage the battery contacts 44 against the battery terminals 34, the battery contacts 44 may also include springs (not shown) to ensure the that the electrical communication between the battery terminals 34 and the battery contact 44 is not broken. Typically, the surface of the flex circuit 26 on which the battery contacts 44 are located is non-conductive so the device terminals 32 are not in electrical communication with the battery contacts 44 or battery terminals 34. However, in some embodiments, one or more of the battery contacts 44 may act as a pass-through contact 47, allowing power to pass between the device terminals 32 and the battery terminals 34 while the flex circuit 26 is disposed therebetween.

The battery contacts 44 may provide an electrical connection to the electronic device 22, the battery 24, and/or the secondary receiving circuit 78. The flex circuit 26 generally includes a battery contact 44 and at least one pass-through contact 47. Specifically, one or more battery contacts 44 can provide power to at least one of the battery 24 and the electronic device 22.

In general, the pass-through contact 47 provides an electrical pathway that is not restrained by the secondary coil 76 or the secondary receiving circuit 78. The pass-through contact 47 may be a power pass-through contact 47', a ground pass-through contact 47", or an excess pass-through contact 47'''. If the pass-through contact 47 is a power pass-through contact 47', power is delivered from the battery 24 to the electronic device 22. In some embodiments, the flex circuit 26 may include a diode (not shown) between the contact on the secondary coil 76 or secondary receiving circuit 78 to prevent power drain to the secondary coil 76 or the secondary receiving circuit 78 when no charging is present, while yet allowing power to flow between the battery 24 and the electronic device 22.

If the pass-through contact 47 is a ground pass-through contact 47", the ground pass-through contact 47" communicates the ground terminal (−) included with the battery terminals 34 with the ground terminal (−) included with the device terminals 32 to. As a result, a ground reference is provided to both the battery 24 and the electronic device 22. If the flex circuit 26 also communicates with the ground pass-through contact 47", measures can be used to prevent power drain the battery 24.

The pass-through contacts 47 may further include an excess contact 47''' that provides a direct interface to the electronic device 22 and/or the battery 24. Accordingly, the excess pass-through contact 47''' is not in communication with either the secondary coil 76 or the secondary receiving circuit 78. Also, the pass-through contacts 47 may be disposed remotely from each other as illustrated in FIGS. 5-8 and not sandwiched as illustrated in FIGS. 3-4. When one or more pass-through contacts 47 are located remotely from each other, typically at least one pass-through contact 47 communicates with a device contact 46.

The flex circuit 26 may include device contacts 46 which may provide power to the electronic device 22 and/or may act as pass-through contacts 47 between the battery terminals 34 and the device terminals 32 when in electrical communication with the battery contacts 44. The device contacts 46 may include first and second surfaces 49, 51 similar to the battery contacts 44. Where secondary surfaces 49,51 are included with the device contacts 46, the first and second surfaces 49,51 of the device contacts 46 are typically in electrical communication with each other. While the flex circuit 26 may be made without device contacts 46, when the device terminals 32 are directly contacting the battery terminals 34, the device contacts 46 may be added to more securely pass power between the electronic device 22 and the battery 24. For example, if the flex circuit 26 is only disposed between one half of the battery contacts 44, in some devices this could cause misalignment of the battery 24 and the electronic device 22, thereby potentially causing an inoperable condition if the device terminals 32 lose electrical communication with the battery terminals 34. Therefore, even if the device contacts 46 are only pass-through contacts 47 and not electrically connected to the secondary coil 76 and/or secondary receiving circuit 78, they may help keep the battery 24 aligned within the compartment 30. The device contacts 46 are also helpful if it is advantageous to position the electronic device 22 and the battery 24 such that the device terminals 32 are remotely located from the battery terminals 34, as shown in FIG. 5 and FIG. 7. Accordingly, the battery contacts 44 and the device contacts 46 provide an electrical connection between the battery terminals 34 and the device terminals 32. Repositioning the battery 24 is helpful at times to minimize interference with the secondary coil 76 while maximizing power transfer. The repositioning may also be helpful for packaging and space issues when the flex circuit 26 is wrapped around the battery 24 in the compartment 30. The secondary coil 76 may include a power lead 80 and a ground lead 82. The secondary coil 76 typically extends in a spiral manner, which defines an inner perimeter 84. The secondary coil 76 may be disposed on the flex circuit 26.

The secondary receiving circuit 78 is in communication with the power lead 80 of the secondary coil 76. The ground lead 82 of secondary coil 76 is connected with a ground contact 52 for communicating with the ground reference. The ground pass-through contact 47" may act as a device contact 46, a battery contact 44, or both a device contact 46 and a battery contact 44. When the flex circuit 26 is introduced to an electromagnetic field, current is induced through the secondary coil 76 and power is delivered to the secondary receiving circuit 78. The secondary receiving circuit 78 regulates the level of power delivered to the battery 24.

The arrangements of the flex circuit 26, the battery 24, and the electronic device 22 with respect to the electrical communication with one another may vary. In addition, the battery contacts 44 and/or device contacts 46 may be disposed at various locations on the flex circuit 26. For example, FIG. 3 illustrates an exemplary arrangement of a flex circuit interface 20. The flex circuit 26 includes a first folding-portion 64 combined with a battery 24 having battery terminals 34 disposed on the battery 24. A secondary coil 76 is disposed on the primary-portion 62 of the flex circuit 26. The secondary receiving circuit 78 is disposed within the inner perimeter 84 of the secondary coil 76. Four battery contacts 44 and four device contacts 46 are disposed on the first folding-portion 64 and are aligned side-by-side along the right end. Although four contacts battery contacts 44 and four device contacts 46 are shown, it can be understood that any number of terminals may be used, such as two, three, etc. The first and second surfaces 43, 45 of each of the battery contacts 44 may be in electrical communication with corresponding first and second surfaces 59, 51 of the device contacts 46 and aligned directly below the device contacts 46.

In the embodiment above, the flex circuit 26 is generally disposed against the front surface 36 of the battery 24, however, the battery 24 can be disposed within the compartment 30 thereby allowing easy removal and replacement of the battery 24. The first section 72 of the first folding-portion 64 is folded toward the battery 24 and against the battery side. The second section 74 of the folding-portion 64 is folded against the battery 24 such that each battery contact 44 contacts a corresponding battery terminal 34. The battery 24 is then disposed in the compartment 30 of the electronic device 22 such that the battery terminals 34 are aligned above the device terminals 32. As a result, the flex circuit 26 is sandwiched in between the battery 24 and the electronic device 22 such that each device contact 46 contacts a corresponding device terminal 32. The power contact 45 included with the battery contacts 44 provides a direct interface with the battery 24.

FIG. 5 shows a second exemplary arrangement between the flex circuit 26 and the battery 24. A flex circuit 26 is illustrated having a second folding-portion 66 adjacent a primary-portion 62. A first folding-portion 64 is included adjacent the primary-portion 62 and opposite the second folding-portion 66. The secondary receiving circuit 78 is disposed on one of the folding-portions 66. A set of four battery contacts 44 is disposed on the primary-portion 62 adjacent the second folding-portion 66. The secondary coil 76 is disposed on the primary-portion 62 between the battery contacts 44 and the first folding-portion 64. The device contacts 46 are disposed on the first folding-portion 64 of the flex circuit 26.

In the embodiment illustrated in FIG. 3, the flex circuit 26 is disposed against the battery 24 a section folded toward the side of the battery 24. The flex circuit 26 is further folded against the battery 24 to dispose each of the battery contacts 44 against a corresponding battery terminal 34. The battery 24 is positioned within the compartment 30 to dispose each of the device contacts 46 against a corresponding device terminal 32. The battery contacts 44 may be in electrical communication with the device contacts 46 to provide an electrical connection between the battery 24 and the electronic device 22.

FIG. 7 shows another exemplary arrangement between the flex circuit 26 and the battery 24. A flex circuit 26 is illustrated having a first folding-portion 64 and a second folding-portion 66. The secondary receiving circuit 78 is disposed within the inner perimeter 84 defined by the secondary coil 76. A set of four battery contacts 44 are disposed on the second folding-portion 66 and are aligned side-by-side along the left end. A set of four device contacts 46 are disposed on the first folding-portion 64 and are aligned side-by-side along the right end.

As shown in FIG. 7, the battery 24 is disposed in the compartment 30 of the electronic device 22 such that the battery terminals 34 are at an opposite end of the compartment 30 from device terminals 32 and each of the device contacts 46 contact a corresponding device terminal 32. The device terminals may be in electrical communication with the battery contacts 44 to provide an electrical connection between the battery 24 and the electronic device 22. Accordingly, in each of the embodiments described above, the electronic device 22 does not require an external port for receiving power from an external power source. Furthermore, the one or more battery contacts 44 can provide an interface that can allow the battery 24 to be charged while simultaneously delivering power to the electronic device 22.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A flex circuit for inductively charging a power source comprising;
   a primary-portion and at least one folding-portion,
   a secondary coil on one of said primary-portion and said at least one folding-portion,
   a secondary receiving circuit on one of said primary-portion and said at least one folding-portion,
   a battery contact in communication with at least one of said secondary receiving circuit and said secondary coil, and
   at least one pass-through contact having a first surface and a second surface in electrical communication with said first surface.

2. The flex circuit of claim 1 wherein said pass-through contact communicates with a ground reference.

3. The flex circuit of claim 2 wherein said battery contact delivers power from at least one of said secondary receiving circuit and said secondary coil.

4. The flex circuit of claim 3 further comprising a second pass-through contact not in communication with either of said secondary receiving circuit and said secondary coil.

5. The flex circuit of claim 4 further comprising a third pass-through contact not in electrical communication with either of said secondary coil and said secondary receiving circuit.

6. The flex circuit of claim 3 further comprising a second pass-through contact not in communication with both of said secondary receiving circuit and said secondary coil, said second pass-through contact communicating with a ground reference.

7. The flex circuit of claim 1 further including a battery and an electronic device and wherein said battery contact provides power to both the battery and the electronic device and said pass-through contact is in communication with a ground reference.

8. The flex circuit of claim 1 wherein at least one of said pass-through contacts includes a second surface in electrical communication with said first surface.

9. The flex circuit of claim 8 wherein said first and second surfaces of said pass-through contacts are in direct electrical communication with each other with minimal electrical resistance therebetween.

10. The flex circuit of claim 8 wherein said first and second surfaces of said pass-through contacts are in direct communication with each other and independent from said secondary coil and said secondary receiving circuit.

11. The flex circuit of claim 1 further comprising at least one device contact having at least one surface in electrical communication with said at least one pass-through contact.

12. The flex circuit of claim 1 further comprising at least one device contact not in electrical communication with said at least one pass-through contact and having first and second surfaces with said surfaces in electrical communication with each other.

13. The flex circuit of claim 11 wherein said device contact is located remotely from said battery contact and wherein said device contact and said battery contact are in electrical communication with each other.

14. A flex circuit for inductively charging a battery of an electronic device, said electronic device including device terminals and said battery having battery terminals, said flex circuit interface comprising;
    a primary-portion and at least one folding-portion,
    a secondary coil on one of said primary-portion and said at least one folding-portion,
    a secondary receiving circuit on one of said primary-portion and said at least one folding-portion,
    a battery contact in electrical communication with at least one of said secondary receiving circuit and said secondary coil for delivering power to at least one of the battery and the electronic device, and
    at least one pass-through contact having at least one of a first surface facing the battery and in direct communication with the battery and a second surface in direct communication with the electronic device.

15. The flex circuit of claim 14 wherein said pass-through contact communicates with a ground reference.

16. The flex circuit of claim 14 wherein said battery contact provides power to at least one of the battery and the electronic device.

17. The flex circuit of claim 14 further comprising a second pass-through contact not in communication with both said secondary receiving circuit and said secondary coil.

18. The flex circuit of claim 17 further comprising a third pass-through contact for providing power to at least one of the battery and the electronic device.

19. The flex circuit of claim 14 further comprising a second pass-through contact not in communication with both said secondary receiving circuit and said secondary coil, said second pass-through contact communicating with a ground reference.

20. The flex circuit of claim 14 wherein said battery contact provides power to both the battery and the electronic device and said pass-through contact is in communication with a ground reference.

21. The flex circuit of claim 14 further including opposing sides and wherein said first surface is located on an opposing side from said second surface and wherein said first and second surfaces are in electrical communication.

22. The flex circuit of claim 14 further including opposing sides and wherein said first surface is located on the same side as said second surface and wherein said first and second surfaces are in electrical communication.

23. The flex circuit of claim 21 wherein said first and second surfaces are in direct electrical communication with each other with minimal electrical resistance therebetween.

24. The flex circuit of claim 21 wherein said first and second surfaces of said at least one pass-through contact are in direct communication with each other and independent from said secondary coil and said secondary receiving circuit.

25. The flex circuit of claim 14 further comprising at least one device contact not in communication with said at least one pass-through contact and having a first surface and second surface.

26. The flex circuit of claim 24 wherein said device contact includes a second surface being in electrical communication with said first surface said device contact.

27. The flex circuit of claim 26 wherein said second surface of said battery contact is in electrical communication with said second surface of said device contact.

28. The flex circuit of claim 23 wherein said device contact is located remotely from said battery contact.

29. The flex circuit of claim 14 further comprising a first crease and a second crease formed on said folding section for guiding said folding-portion around the battery.

30. A flex circuit interface for inductively charging a power source comprising, an electronic device having a compartment including device terminals disposed therein,
- a battery sized to fit within said compartment and wherein said battery includes a plurality of battery terminals disposed against said device terminals,
- said plurality of battery terminals including at least one ground terminal connected to a ground reference and at least one power terminal,
- a flex circuit including a primary-portion and at least one folding-portion having creases for defining a first section and a second section for folding around at least one side of said battery,
- a secondary coil disposed on one of said primary-portion and said folding-portion,
- a secondary receiving circuit disposed on one of said primary portion and said folding portion and in communication with said secondary coil,
- a battery contact disposed on one of said primary-portion and said folding-portion and in communication with said secondary receiving circuit for providing power to said power terminal of said battery,
- at least one pass-through terminal for delivering power from said battery to said electronic device.

31. The flex circuit of claim 30 wherein said pass-through contact is not in communication with either of said secondary coil and said secondary receiving circuit.

32. The flex circuit of claim 30 wherein said plurality of device contacts includes at least one ground pass-through contact for communicating with at least one of said ground terminals.

* * * * *